(12) United States Patent
Ohisa et al.

(10) Patent No.: US 10,151,259 B2
(45) Date of Patent: Dec. 11, 2018

(54) ENGINE CONTROL DEVICE (71) Applicant: MAZDA MOTOR CORPORATION, Hiroshima (JP)

(72) Inventors: Chikako Ohisa, Hiroshima (JP); Osamu Sunahara, Hiroshima (JP); Daisuke Umetsu, Hiroshima (JP); Takuo Hirano, Higashihiroshima (JP); Kunihiro Shishima, Hiroshima (JP); Takahiro Kawamura, Hiroshima (JP); Yasunori Takahara, Hiroshima (JP); Daisaku Ogawa, Hiroshima (JP); Takeatsu Ito, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 115 days.

(21) Appl. No.: 15/446,348

(22) Filed: Mar. 1, 2017

(65) Prior Publication Data
US 2017/0254281 A1 Sep. 7, 2017

(30) Foreign Application Priority Data

Mar. 3, 2016 (JP) .................. 2016/041074

(51) Int. Cl.
*F02D 41/02* (2006.01)
*F02D 9/02* (2006.01)
(Continued)

(52) U.S. Cl.
CPC .......... *F02D 41/023* (2013.01); *F02D 9/02* (2013.01); *F02D 11/105* (2013.01);
(Continued)

(58) Field of Classification Search
CPC .......... B60W 2540/18; F02D 41/023; F02D 2250/18; F02D 2250/26; F16H 63/502
(Continued)

(56) References Cited

U.S. PATENT DOCUMENTS 7,516,006 B2 * 4/2009 Mori .................. B60K 23/0808
180/233
7,681,960 B2 * 3/2010 Wanke ................ B60T 8/17555
303/146
(Continued)

FOREIGN PATENT DOCUMENTS

JP 2007-278302 A 10/2007
JP 2011-088576 A 5/2011
(Continued)

OTHER PUBLICATIONS

An Office Action; "Notice of Reasons for Rejection," mailed by the Japanese Patent Office dated Feb. 13, 2017, which corresponds to Japanese Patent Application No. 2016-041074 and is related to the present application; with English language Concise Explanation.

*Primary Examiner* — Erick Solis

(74) *Attorney, Agent, or Firm* — Studebaker & Brackett PC (57) ABSTRACT

The engine control device comprises a basic target torque-deciding part for deciding a basic target torque based on a driving state of a vehicle, a torque reduction amount-deciding part for deciding a torque reduction amount based on a steering wheel operation state, an TCM for deciding a torque-down demand amount, based on a driving state of the vehicle other than the steering wheel operation state, and a final target torque-deciding part for deciding a final target torque, based on the decided basic target torque, the decided torque reduction amount and the decided torque-down demand amount, wherein the final target torque-deciding part is operable, when there is a torque-down demand, to restrict a change in the final target torque corresponding to a change in the torque reduction amount.

9 Claims, 6 Drawing Sheets

(51) Int. Cl.
*F16H 63/50* (2006.01)
*F02D 11/10* (2006.01)
*F02D 41/00* (2006.01)

(52) U.S. Cl.
CPC ....... *F02D 41/0002* (2013.01); *F16H 63/502* (2013.01); *B60W 2540/18* (2013.01); *F02D 2200/501* (2013.01); *F02D 2200/602* (2013.01); *F02D 2250/18* (2013.01); *F02D 2250/26* (2013.01); *Y02T 10/42* (2013.01)

(58) Field of Classification Search
USPC .......... 701/72, 84, 85, 105, 110; 123/406.23
See application file for complete search history.

(56) References Cited

U.S. PATENT DOCUMENTS

2004/0199316 A1* 10/2004 Kato ................ B60W 30/02
                                                               701/41
2012/0209489 A1     8/2012 Saito et al.

FOREIGN PATENT DOCUMENTS

| JP | 2014-166014 A | 9/2014 |
| JP | 2015-085823 A | 5/2015 |

\* cited by examiner

ENGINE CONTROL DEVICE

TITLE OF INVENTION

Engine control device

TECHNICAL FIELD

The present invention relates to an engine control device, and more particularly to an engine control device for controlling an engine based on a driving state of a vehicle equipped with the engine.

BACKGROUND ART

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust load to be applied to front road wheels as steerable road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle (engine torque) according to yaw rate-related quantity corresponding to a steering wheel operation by a driver (e.g., yaw acceleration), thereby making it possible to quickly generate vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsivity with respect to a turning operation of a steering wheel. This makes it possible to realize a vehicle behavior as intended by the driver.

CITATION LIST

Patent Document

Patent Document 1: JP 2011-88576A
Patent Document 2: JP 2014-166014A

SUMMARY OF INVENTION

Technical Problem

Meanwhile, there are some cases where control for reducing engine torque is performed based on a driving state other than the steering wheel operation state, in addition to being performed by the vehicle behavior control device described in the Patent Document 2. For example, in a powertrain of a vehicle equipped with an automatic transmission, there has been known a during-shift torque-down control of reducing engine torque during a shift event of the automatic transmission, for example, by momentarily stopping supply of fuel or retarding ignition timing, so as to reduce shift shock, i.e., shock during the shift event.

However, the torque reduction by the vehicle behavior control device described in the Patent Document 2 and the torque reduction by the during-shift torque-down control can be overlappingly performed. In this case, a total torque reduction amount is likely to become excessive, possibly causing unintended torque shock and degraded drive feel.

The present invention has been made to solve the above conventional problem, and an object thereof is to provide an engine control device capable of controlling an engine so as to accurately realize a vehicle behavior as intended by a driver, while satisfying both of torque reduction based on a driving state other than a steering wheel operation state and torque reduction based on the steering wheel operation state to thereby suppress the occurrence of torque shock and degradation in drive feel.

Solution to Technical Problem

In order to achieve the above object, the present invention provides an engine control device for controlling an engine based on a driving state of a vehicle equipped with the engine. The engine control device comprises: a basic target torque-deciding part for deciding a basic target torque based on a driving state of the vehicle including an accelerator pedal operation state; a torque reduction amount-deciding part for deciding a torque reduction amount based on a steering wheel operation state of the vehicle; a torque-down demand amount-deciding part for deciding whether or not there is a torque-down demand, based on a driving state of the vehicle other than the steering wheel operation state, and, when there is the torque-down demand, deciding a torque-down demand amount; a final target torque-deciding part for deciding a final target torque, based on the decided basic target torque, the decided torque reduction amount and the decided torque-down demand amount; and an engine output control part for controlling the engine to cause the engine to output the decided final target torque, wherein the final target torque-deciding part is operable, when there is the torque-down demand, to restrict a change in the final target torque corresponding to a change in the torque reduction amount.

In the engine control device of the present invention having the above feature, the final target torque-deciding part is operable, when it is decided, based on a driving state of the vehicle other than the steering wheel operation state, that there is the torque-down demand, to restrict a change in the final target torque corresponding to a change in the torque reduction amount decided by the torque reduction amount-deciding part, so that, in a situation where the torque reduction according to the steering wheel operation state and the torque reduction according to a driving state of the vehicle other than the steering wheel operation state and based on the torque-down demand are overlappingly performed, it is possible to prevent a total torque reduction amount from becoming excessive. This makes it possible to control the engine so as to accurately realize a vehicle behavior as intended by a driver, while satisfying both of the torque reduction based on a driving state other than the steering wheel operation state and the torque reduction based on the steering wheel operation state to thereby suppress the occurrence of torque shock and degradation in drive feel.

Preferably, in the engine control device of the present invention, the final target torque-deciding part is operable, when there is the torque-down demand, to prohibit a change in the final target torque corresponding to a change in the torque reduction amount.

In the engine control device having this feature, in the situation where the torque reduction according to the steering wheel operation state and the torque reduction based on the torque-down demand are overlappingly performed, it is possible to reliably prevent a total torque reduction amount from becoming excessive. This makes it possible to control the engine so as to accurately realize a vehicle behavior as intended by a driver, while satisfying both of the torque reduction based on a driving state other than the steering wheel operation state and the torque reduction based on the steering wheel operation state to thereby reliably suppress the occurrence of torque shock and degradation in drive feel.

Preferably, in the engine control device of the present invention, the engine control device is an engine control device for controlling an engine of a vehicle equipped with an automatic transmission, wherein the torque-down demand amount-deciding part is operable, when a shift event of the automatic transmission is performed, to decide the torque-down demand amount so as to reduce shock due to the shift event.

In the engine control device having this feature, when there is a torque-down demand, for example, during a shift event of the automatic transmission, to restrict a change in the final target torque corresponding to a change in the torque reduction amount decided by the torque reduction amount-deciding part, so that, in a situation where the torque reduction according to the steering wheel operation state and the torque reduction based on the during-shift torque-down demand are overlappingly performed, it is possible to prevent a total torque reduction amount from becoming excessive. This makes it possible to control the engine so as to accurately realize a vehicle behavior as intended by a driver, while satisfying both of the torque reduction based on the during-shift torque-down demand and the torque reduction based on the steering wheel operation state to thereby suppress the occurrence of torque shock and degradation in drive feel.

Preferably, in the engine control device of the present invention, the final target torque-deciding part is operable, when the decided torque-down demand amount is less than the decided torque reduction amount, to decide the final target torque, based on the decided basic target torque and the decided torque reduction amount, and, when the decided torque-down demand amount is equal to or greater than the decided torque reduction amount, to decide the final target torque, based on the decided basic target torque and the decided torque-down demand amount.

The engine control device having this feature can satisfy both of the torque reduction based on a driving state other than the steering wheel operation state and the torque reduction based on the steering wheel operation state, while preventing a total torque reduction amount from becoming excessive.

Effect of Invention

The engine control device of the present invention can control the engine so as to accurately realize a vehicle behavior as intended by a driver, while satisfying both of the torque reduction based on a driving state other than the steering wheel operation state and the torque reduction based on the steering wheel operation state to thereby suppress the occurrence of torque shock and degradation in drive feel.

BRIEF DESCRIPTION OF DRAWINGS

FIG. 6 is a time chart presenting a temporal change in each parameter pertaining to engine control to be performed by the engine control device according to this embodiment during turning of a vehicle equipped with the engine control device, wherein: chart (a) is a top plan view schematically depicting the vehicle which is turning in a clockwise direction; chart (b) presents a change in steering wheel angle of the vehicle which is turning in the clockwise direction as depicted in the chart (a); chart (c) presents a change in steering speed of the vehicle which is turning in the clockwise direction as depicted in the chart (a); chart (d) presents a change in additional deceleration decided based on the steering speed presented in the chart (c); chart (e) presents a change in torque reduction amount decided based on the additional deceleration presented in the chart (d); chart (f) presents a change in basic target torque; chart (g) presents a change in during-shift torque-down demand amount; chart (h) presents a change in final target torque decided based on the basic target torque, the torque reduction amount and the during-shift torque-down demand amount; chart (i) presents a changes in target air amount decided based on the final target torque; and chart (j) presents a change in yaw rate (actual yaw rate) generated in the vehicle when an intake air amount is controlled as presented in the chart (i), and a change in actual yaw rate generated in the vehicle when the intake air amount control based on the torque reduction amount is not performed.

DESCRIPTION OF EMBODIMENTS

With reference to the accompanying drawings, an engine control device according to one embodiment of the present invention will now be described.

Figure 1:
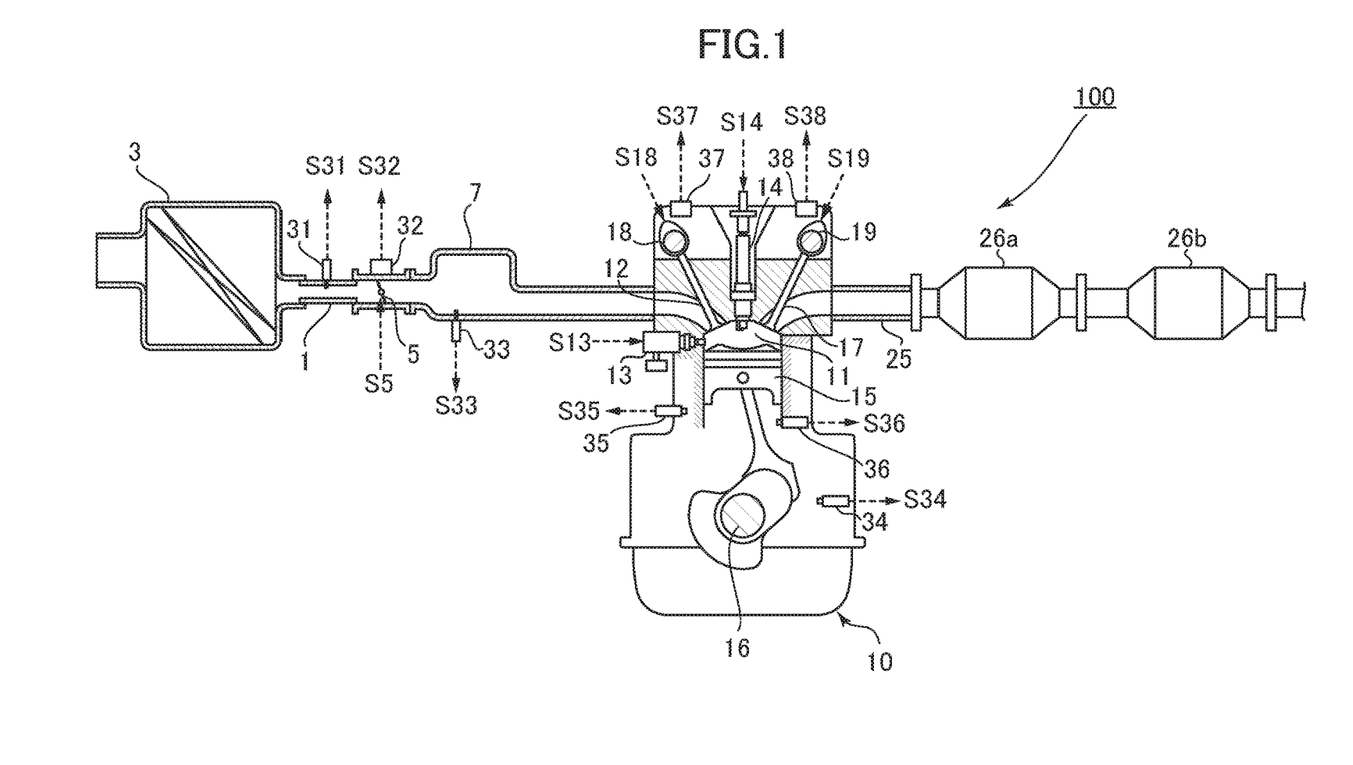
FIG. 1 is a schematic diagram depicting a configuration of an engine employing an engine control device according to one embodiment of the present invention.

First of all, an engine control system using an engine control device according to one embodiment of the present invention will be described with reference to FIGS. 1 and 2. FIG. 1 is a schematic diagram depicting a configuration of an engine employing the engine control device according to this embodiment, and FIG. 2 is a block diagram depicting an electrical configuration of an engine control system using the engine control device according to this embodiment.

Figure 2:
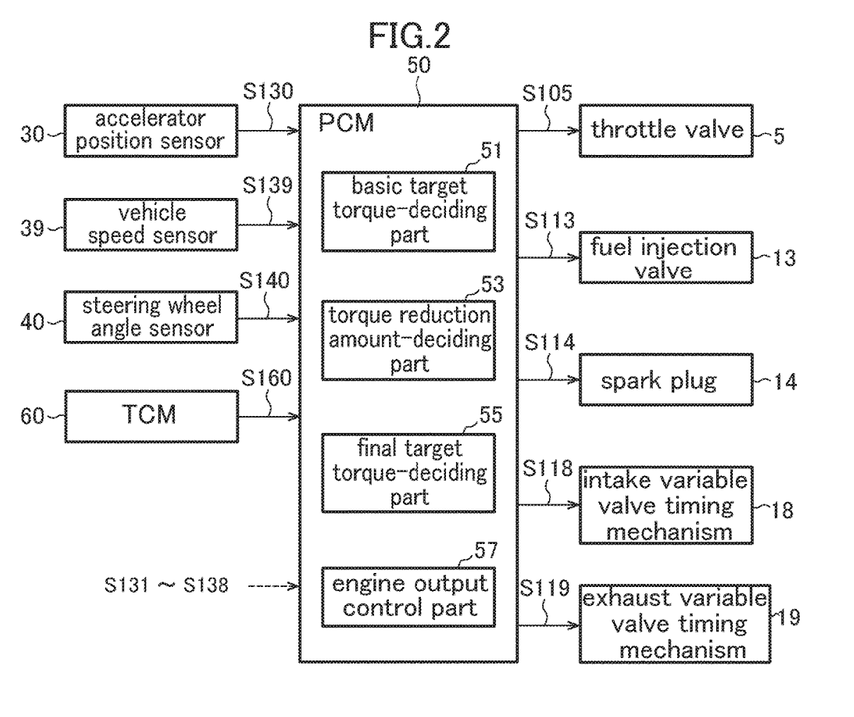
FIG. 2 is a block diagram depicting an electrical configuration of an engine control system using the engine control device according to this embodiment.

As depicted in FIGS. 1 and 2, the engine system 100 primarily comprises: an intake passage 1 for allowing intake air (air) introduced from outside to pass therethrough, an engine 10 (specifically, gasoline engine) for generating a vehicle driving force through combustion of a mixture of intake air supplied from the intake passage 1 and fuel supplied from an aftermentioned fuel injection valve 13, and an exhaust passage 25 for discharging exhaust gas produced by the combustion within the engine body; a plurality of sensors 30 to 40 for detecting various states concerning control of the engine system 100; and a PCM 50 (engine control device) for controlling an entirety of the engine system 100.

The intake passage 1 is provided with an air cleaner 3 for cleaning intake air introduced from outside, a throttle valve 5 for adjusting an amount of intake air passing therethrough (intake air amount), and a surge tank 7 for temporarily reserving intake air to be supplied to the engine 10, which are arranged in this order from the side of an upstream end of the intake passage 1.

The engine 10 is primarily provided with: an intake valve 12 for selectively introducing intake air from the intake passage 1 into a combustion chamber 11; a fuel injection valve 13 for injecting fuel toward the combustion chamber 11; a spark plug 14 for igniting a mixture of the intake air and the fuel supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging exhaust gas produced by the combustion of the air-fuel mixture within the combustion chamber 11, to the exhaust passage 25.

The engine 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, one of various heretofore-known types may be applied. For example, a variable valve timing mechanism of an electromagnetic type or a hydraulic type may be employed to variably control the operation timings of the intake valve 12 and the exhaust valve 17.

The exhaust passage 25 is provided with a plurality of exhaust gas purifying catalysts 26a, 26b having exhaust gas purifying functions, such as a NOx catalyst, a three-way catalyst and an oxidation catalyst. In the following description, when the exhaust gas purifying catalysts 26a, 26b are generically used without being functionally distinguished from each other, they will be described as "exhaust gas purifying catalyst 26".

As mentioned above, the engine system 100 comprises a plurality of sensors 30 to 40 for detecting various states concerning the engine system 100. Specifically, these sensors 30 to 40 are as follows. The sensor 30 is an accelerator position sensor for detecting an accelerator position, i.e., an angular position of a non-depicted accelerator pedal (which is equivalent to an amount of depression of the accelerator pedal manipulated by a driver). The sensor 31 is an airflow sensor for detecting an intake air amount which is equivalent to a flow rate of intake air passing through the intake passage 1. The sensor 32 is a throttle opening sensor for detecting a throttle opening which is an opening degree of the throttle valve 5. The sensor 33 is a pressure sensor for detecting an intake manifold pressure (internal pressure of an intake manifold) which is equivalent to a pressure of intake air supplied to the engine 10. The sensor 34 is a crank angle sensor for detecting a crank angle of the crankshaft 16. The sensor 35 is a water temperature sensor for detecting a water temperature which is a temperature of cooling water for cooling the engine 10. The sensor 36 is an in-cylinder temperature sensor for detecting an in-cylinder temperature which is an internal temperature of each cylinder of the engine 10. The sensors 37 and 38 are, respectively, an intake-side cam angle sensor for detecting operation timings of the intake valve 12 including a valve-close timing, and an exhaust-side cam angle sensor for detecting operation timings of the exhaust valve 17 including a valve-close timing The sensor 39 is a vehicle speed sensor for detecting a speed of a vehicle equipped with the engine 10 (vehicle speed). The sensor 40 is a steering wheel angle sensor for detecting a rotational angle (steering wheel angle) of a steering wheel (not depicted). The above sensors 30 to 40 are operable to output, to the PCM 50, detection signals S130 to S140 corresponding to detected parameters, respectively.

Based on the detection signals S130 to S140 input from the sensors 30 to 40, the PCM 50 is operable to perform controls for various components of the engine system 100. Specifically, as depicted in FIG. 2, the PCM 50 is operable to: supply a control signal S105 to the throttle valve 5 to control of opening and closing timings and the throttle opening of the throttle valve 5; supply a control signal S113 to the fuel injection valve 13 to control a fuel injection amount and a fuel injection timing; supply a control signal S114 to the spark plug 14 to control an ignition timing; and supply control signals S118, S119, respectively, to the intake variable valve timing mechanism 18 and the exhaust variable valve timing mechanism 19 to control the operation timings of the intake valve 12 and the exhaust valve 17.

A TCM 60 (torque-down demand amount-deciding part) for controlling an automatic transmission mounted on the vehicle is operable to input a control signal S160 corresponding to a during-shift torque-down demand amount for reducing shift shock during a shift event of the automatic transmission into the PCM 50. Specifically, the TCM 60 is operable, based on detection signals from the sensors 30 to 40 of the engine system 100 and sensors (not depicted) installed in the automatic transmission, to perform a shift event of the automatic transmission, according to a shift schedule preliminarily set with respect to engine load and vehicle speed. In this process, the TCM 60 is also operable to set, to an ON state, a torque-down demand flag indicating whether or not there is a during-shift torque-down demand, and, based on a driving state of the vehicle detected by the above sensors, to decide a during-shift torque-down demand amount so as to reduce shift shock due to the shift event. Then, the TCM 60 is operable to output the set torque-down demand flag and a control signal S160 corresponding to the decided during-shift torque-down demand amount, to the PCM 50.

In case where an upshift event is performed, the TCM 60 is operable to refer to a during-shift torque-down demand amount map defining a relationship between an engine torque just before a shift event and the during-shift torque-down demand amount (this map is preliminarily created and stored in a memory or the like), and decide a value of the during-shift torque-down demand amount corresponding to a current engine torque. This during-shift torque-down demand amount map is defined such that the during-shift torque-down demand amount becomes larger as a difference between engine speeds of the engine 10 before and after a shift event becomes larger.

The PCM 50 further comprises: a basic target torque-deciding part 51 for deciding a basic target torque based on a driving state of the vehicle including an accelerator pedal operation state; a torque reduction amount-deciding part 53 for deciding a torque reduction amount based on a driving state of the vehicle other than the accelerator pedal operation state; a final target torque-deciding part 55 for deciding a final target torque based on the decided basic target torque and the decided torque reduction amount; and an engine output control part 57 for controlling the engine 10 to cause the engine 10 to output the decided final target torque.

The above parts or elements of the PCM 50 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 3 to 5, an engine control processing routine to be executed by the engine control device according to this embodiment will be described.

Figure 3:
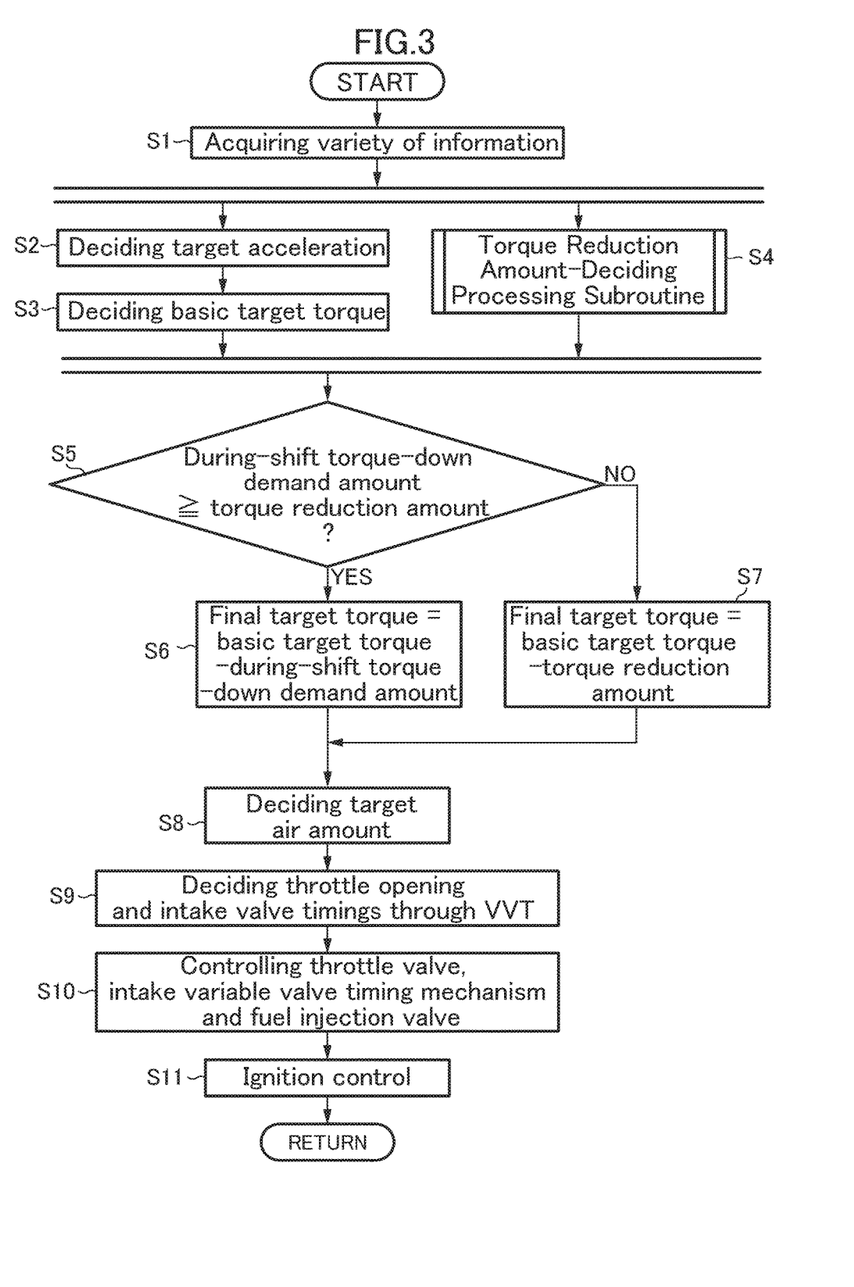
FIG. 3 is a flowchart of an engine control processing routine to be executed by the engine control device according to this embodiment, so as to control an engine.
Figure 4:
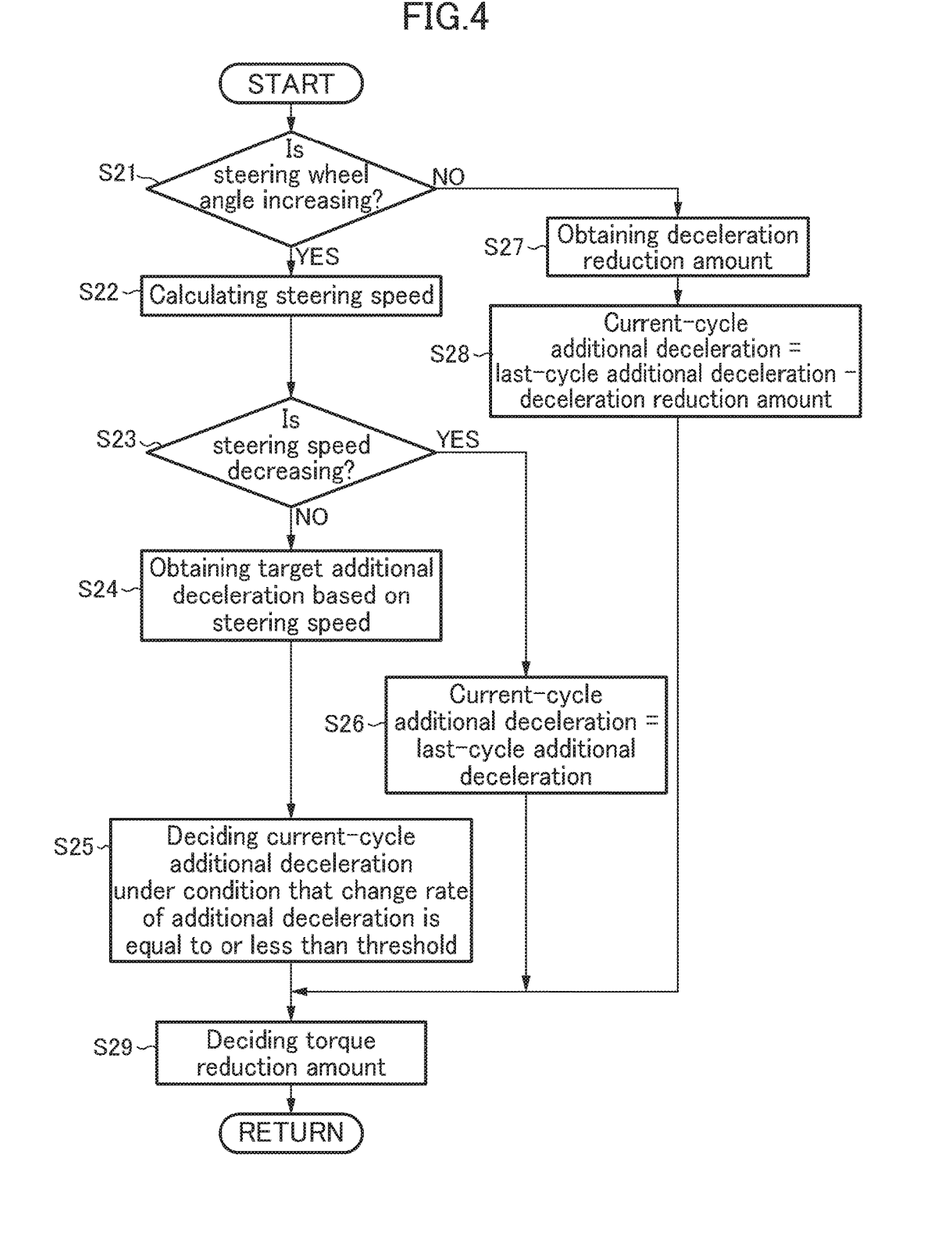
FIG. 4 is a flowchart of a torque reduction amount-deciding processing subroutine to be executed by the engine control device according to this embodiment, so as to decide a torque reduction amount.

FIG. 3 is a flowchart of an engine control processing routine to be executed by the engine control device according to this embodiment, so as to control the engine 10, and FIG. 4 is a flowchart of a torque reduction amount-deciding processing subroutine to be executed by the engine control device according to this embodiment, so as to decide the torque reduction amount. FIG. 5 is a map depicting a relationship between steering speed, and target additional deceleration to be decided by the engine control device according to this embodiment.

The engine control processing routine in FIG. 3 is activated when an ignition switch of the vehicle is turned on to apply power to the engine control device, and repeatedly executed with a given cycle period.

As depicted in FIG. 3, upon start of the engine control processing routine, in step S1, the PCM 50 operates to acquire information about a driving state of the vehicle. Specifically, the PCM 50 operates to acquire, as information about a driving state of the vehicle, detection signals S130 to S140 output from the aforementioned sensors 30 to 40, including an accelerator position detected by the accelerator position sensor 30, a vehicle speed detected by the vehicle speed sensor 39, a steering wheel angle detected by the steering wheel angle sensor 40, and a speed stage currently set in the automatic transmission of the vehicle.

Subsequently, in step S2, the basic target torque-deciding part 51 of the PCM 50 operates to set a target acceleration based on the driving state of the vehicle including an accelerator pedal operation state, acquired in the step S1. Specifically, the basic target torque-deciding part 51 operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the basic target torque-deciding part 51 operates to decide a basic target torque of the engine 10 for realizing the target acceleration decided in the step S2. In this processing, the basic target torque-deciding part 51 operates to decide the basic target torque within a torque range outputtable by the engine 10, based on current vehicle speed, speed stage, road grade, road surface mu (μ), etc.

In parallel with the processings in the steps S2 and S3, in step S4, the torque reduction amount-deciding part 53 operates to perform a torque reduction amount-deciding processing subroutine for deciding a torque reduction amount based on a driving state of the vehicle other than the accelerator pedal operation state. This torque reduction amount-deciding processing subroutine will be described with reference to FIG. 4.

As depicted in FIG. 4, upon start of the torque reduction amount-deciding processing subroutine, in step S21, the torque reduction amount-deciding part 53 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 53 operates to calculate a steering speed based on the steering wheel angle acquired in the step S1.

Subsequently, in step S23, the torque reduction amount-deciding part 53 operates to determine whether or not an absolute value of the steering speed is decreasing.

As a result, when the absolute value of the steering speed is not decreasing, i.e., the absolute value of the steering speed is increasing or the absolute value of the steering speed does not change, the subroutine proceeds to step S24. In the step S24, the torque reduction amount-deciding part 53 operates to obtain a target additional deceleration based on the calculated steering speed. This target additional deceleration is a deceleration to be added to the vehicle according to the steering wheel operation state in order to accurately realize a vehicle behavior which is intended by a driver.

Figure 5:
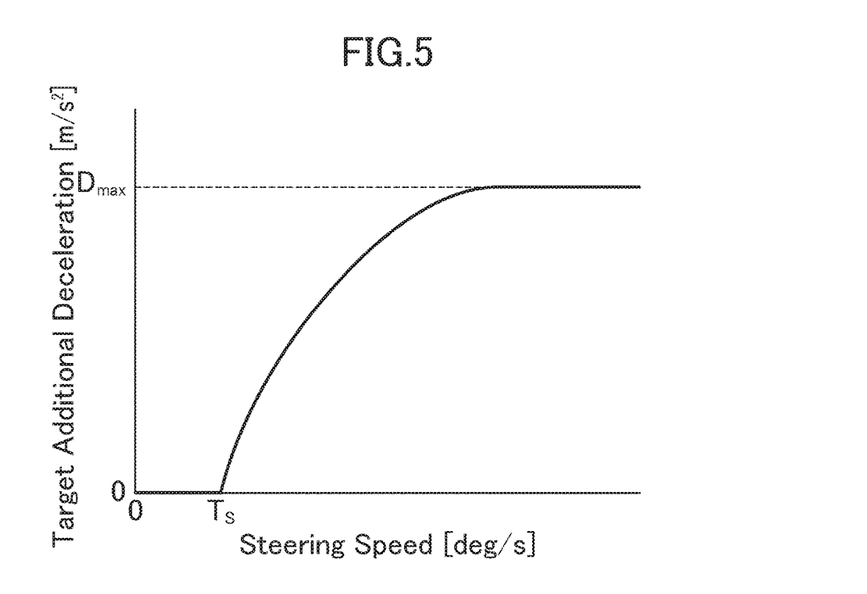
FIG. 5 is a map depicting a relationship between steering speed, and target additional deceleration to be decided by the engine control device according to this embodiment.

Specifically, the torque reduction amount-deciding part 53 operates to obtain a value of the target additional deceleration corresponding to the steering speed calculated in the step S22, based on a relationship between target additional deceleration and steering speed, shown by the map in FIG. 5.

In FIG. 5, the horizontal axis represents the steering speed, and the vertical axis represents the target additional deceleration. As depicted in FIG. 5, when the steering speed is less than a threshold $T_s$ (e.g., 10 deg/s), a corresponding value of the target additional deceleration is 0. That is, when the steering speed is less than the threshold $T_s$, the control of adding deceleration to the vehicle according to the steering wheel operation state is not performed.

On the other hand, when the steering speed is equal to or greater than the threshold $T_s$, a value of the target additional deceleration corresponding to this steering speed comes closer to a given upper limit value $D_{max}$ (e.g., 1 m/s$^2$) as the steering speed becomes larger. That is, as the steering speed becomes larger, the target additional deceleration becomes larger, and a rate of increase of the target additional deceleration becomes smaller.

Subsequently, in the step S25, the torque reduction amount-deciding part 53 operates to decide an additional deceleration in the current processing cycle (current-cycle additional deceleration), under a condition that an increase rate of the additional deceleration is equal to or less than a threshold $R_{max}$ (e.g., 0.5 m/s$^3$).

Specifically, the torque reduction amount-deciding part 53 operates to, when an increase rate from an additional deceleration decided in the last processing cycle (last-cycle additional deceleration) to the target additional deceleration decided in the step S24 in the current processing cycle is equal to or less than the threshold $R_{max}$, decide the target additional deceleration decided in the step S24, as the current-cycle additional deceleration.

On the other hand, the torque reduction amount-deciding part 53 operates to, when the increase rate from the last-cycle additional deceleration to the target additional deceleration decided in the step S24 in the current processing cycle is greater than the threshold $R_{max}$, decide, as the current-cycle additional deceleration, a value obtained by increasing the last-cycle additional deceleration at the increase rate $R_{max}$ for the given cycle period.

Referring to the step S23 again, when the absolute value of the steering speed is decreasing, the subroutine proceeds to step S26. In the step S26, the torque reduction amount-deciding part 53 operates to decide the last-cycle additional deceleration as the current-cycle additional deceleration. That is, when the absolute value of the steering speed is decreasing, an additional deceleration corresponding to a maximum value of the steering speed (i.e., a maximum value of the additional deceleration) is maintained.

Referring to the step S21 again, when the absolute value of the steering wheel angle is not increasing (i.e., is maintained constant or is decreasing), the subroutine proceeds to step S27. In the step S27, the torque reduction amount-deciding part 53 operates to obtain an amount (deceleration reduction amount) by which the last-cycle additional deceleration is to be reduced in the current processing cycle. For example, the deceleration reduction amount may be calculated based on a constant reduction rate (e.g., 0.3 m/s³) preliminarily stored in a memory or the like. Alternatively, the deceleration reduction amount may be calculated based on a reduction rate decided according to the driving state of the vehicle acquired in the step S1 and/or the steering speed calculated in the step S22.

Subsequently, in step S28, the torque reduction amount-deciding part 53 operates to decide the current-cycle additional deceleration by subtracting the deceleration reduction amount obtained in the step S27 from the last-cycle additional deceleration.

After completion of the step S25, S26 or S28, in step S29, the torque reduction amount-deciding part 53 operates to decide the torque reduction amount, based on the current-cycle additional deceleration decided in the step S25, S26 or S28. Specifically, the torque reduction amount-deciding part 53 operates to decide a value of the torque reduction amount required for realizing the current-cycle additional deceleration, based on the current vehicle speed, speed stage, road gradient and others acquired in the step S1. After completion of the step S29, the torque reduction amount-deciding part 53 operates to terminate the torque reduction amount-deciding processing subroutine, and continue the main routine.

Returning to FIG. 3, after completion of the processings in the steps S2 and S3 and the torque reduction amount-deciding processing subroutine in the step S4, in step S5, the final target torque-deciding part 55 operates to determine whether or not the during-shift torque-down demand amount input from the TCM 60 is equal to or greater than the torque reduction amount decided by the torque reduction amount-deciding processing subroutine in the step S4.

As a result, when the during-shift torque-down demand amount is equal to or greater than the torque reduction amount, the routine proceeds to step S6. In the step S6, the final target torque-deciding part 55 operates to subtract the during-shift torque-down demand amount input from the TCM 60, from the basic target torque decided in the step S3 to thereby decide the final target torque.

On the other hand, when the during-shift torque-down demand amount is neither equal to nor greater than the torque reduction amount, i.e., when the during-shift torque-down demand amount is less than the torque reduction amount or when no shift event of the automatic transmission is performed and thus the torque-down demand flag input from the TCM 60 is in an OFF state, the routine proceeds to step S7. In the step S7, the final target torque-deciding part 55 operates to subtract the torque reduction amount decided by the torque reduction amount-deciding processing subroutine in the step S4, from the basic target torque decided in the step S3 to thereby decide the final target torque.

Subsequently, in step S8, the engine output control part 57 operates to decide a target air amount and a target fuel amount which are required for the engine 10 to output the final target torque decided in the step S6 or S7. As used herein, the term "air amount" means an amount of air to be introduced into the combustion chamber 11 of the engine 10. It is to be understood that non-dimensional charging efficiency may be used in place of the air amount.

Specifically, the engine output control part 57 operates to calculate a target indicated torque based on the final target torque and by additionally taking into consideration a loss torque due to friction loss and pumping loss, and calculate a target fuel amount required for generating the target indicated torque, and, based on the calculated target fuel amount and a target equivalent ratio, to decide a target air amount.

Subsequently, in the step S9, the engine output control part 57 operates to decide an opening degree of the throttle valve 5, and opening and closing timings of the intake valve 12 through the intake variable valve timing mechanism 18, while taking into account the air amount detected by the airflow sensor 31, so as to enable air to be introduced into the engine 10 in an amount equal to the target air amount decided in the step S8.

Subsequently, in step S10, the engine output control part 57 operates to control the throttle valve 5 and the intake variable valve timing mechanism 18, based on the throttle opening and the opening and closing timings of the intake valve 12 set in the step S9, and control the fuel injection valve 13, based on the target fuel amount decided in the step S8.

Subsequently, in step S11, the engine output control part 57 operates to set an ignition timing required for the engine 10 to output the final target torque, based on the final target torque decided in the step S6 or S7, and an actual air amount actually introduced into the combustion chamber 11 by controlling the throttle valve 5 and the intake variable valve timing mechanism 18 in the step S10, and control the spark plug 14 so as to perform ignition at the decided ignition timing.

After completion of the step S11, the PCM 50 completes one cycle of the engine control processing routine.

Figure 6:
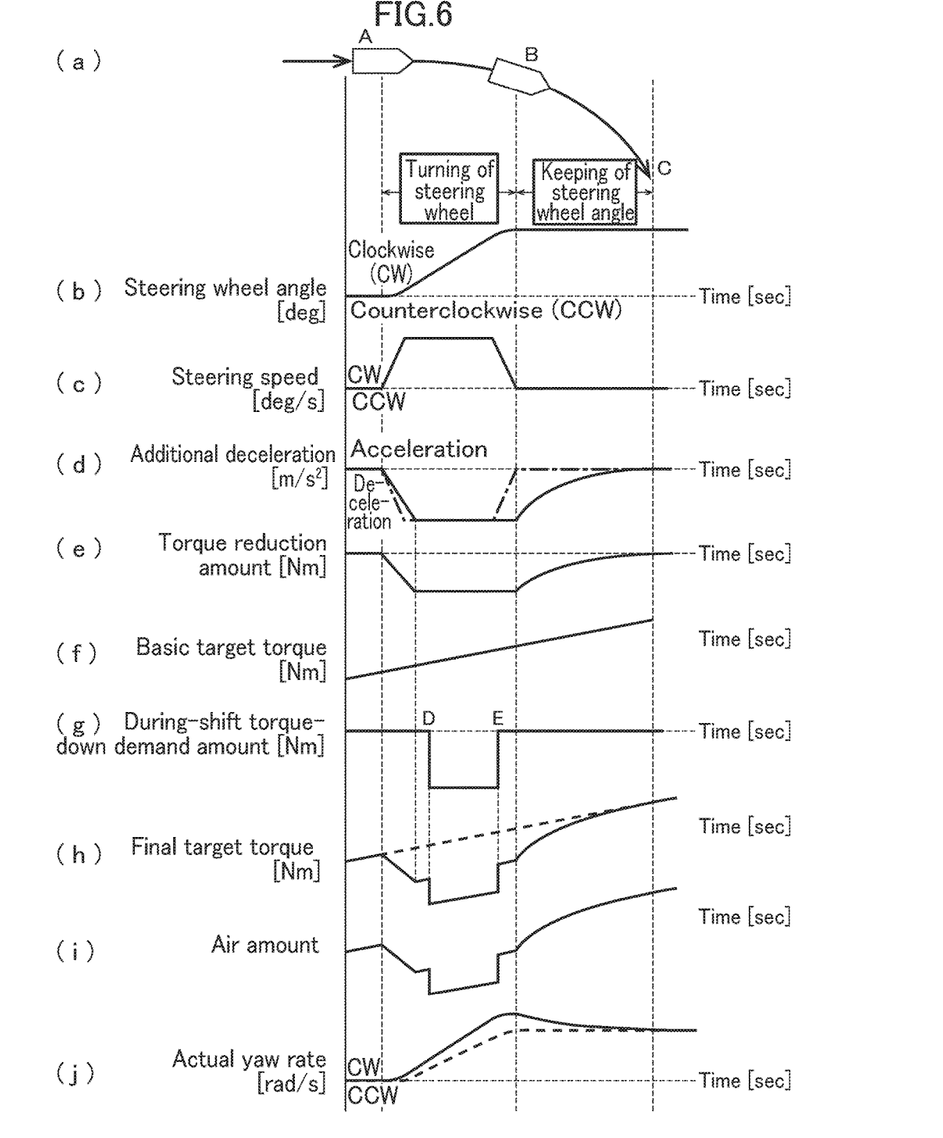

Next, with reference to FIG. 6, an operation of the engine control device according to this embodiment will be described. FIG. 6 is a time chart presenting a temporal change in each parameter pertaining to engine control to be performed by the engine control device according to this embodiment during turning of a vehicle equipped with the engine control device.

Chart (a) is a top plan view schematically depicting the vehicle which is turning in a clockwise direction. As depicted in chart (a), the vehicle starts to turn from a position A, and continues to turn from a position B to a position C in the clockwise direction at a constant steering wheel angle.

Chart (b) presents a change in steering wheel angle of the vehicle which is turning in the clockwise direction as depicted in the chart (a). In the chart (b), the horizontal axis represents time, and the vertical axis represents steering wheel angle.

As presented in the chart (b), clockwise steering is started at the position A, and then, along with an additional turning operation of the steering wheel, a clockwise steering wheel angle gradually increases and reaches a maximum value at the position B. Subsequently, the steering wheel angle is maintained constant until the vehicle reaches the position C (Keeping of the steering wheel angle).

Chart (c) presents a change in steering speed of the vehicle which is turning in the clockwise direction as depicted in the chart (a). In the chart (c), the horizontal axis represents time, and the vertical axis represents steering speed.

The steering speed in the vehicle is expressed as a temporal differentiation of the steering wheel angle in the vehicle. That is, as presented in the chart (c), when clockwise steering is started at the position A, a clockwise steering speed arises and is maintained approximately constant in an intermediate zone between the position A and the position B. Then, when the clockwise steering speed deceases and the clockwise steering wheel angle reaches the maximum value at the position B, the steering speed becomes 0. Then, when the clockwise steering wheel angle is maintained during traveling from the position B to the position C, the steering speed is kept at 0.

Chart (d) presents a change in additional deceleration decided based on the steering speed presented in the chart (c). In the chart (d), the horizontal axis represents time, and the vertical axis represents additional deceleration. In the chart (d), the solid line indicates a change in the additional deceleration decided in the torque reduction amount-deciding processing subroutine in FIG. 4, and the one-dot chain line indicates a change in target additional deceleration based on steering speed. As with the change in steering speed presented in the chart (c), the target additional deceleration indicated by the one-dot chain line starts to increase from the position A, and is maintained approximately constant in an intermediate zone between the position A and the position B, whereafter it decreases, and becomes 0 at the position B.

As described with reference to FIG. 4, when the absolute value of the steering speed is determined in the step S23 to be not decreasing, i.e., to be increasing or to have no change, the torque reduction amount-deciding part 53 operates in the step S24 to obtain the target additional deceleration based on the steering speed. Subsequently, in the step S25, the torque reduction amount-deciding part 53 operates to decide an additional deceleration in each processing cycle, under the condition that the increase rate of additional deceleration is equal to or less than the threshold $R_{max}$.

The chart (d) presents a case where an increase rate of the target additional deceleration starting to increase from the position A is greater than the threshold $R_{max}$. In this case, the torque reduction amount-deciding part 53 operates to increase the additional deceleration at an increase rate equal to the upper limit $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 53 operates to decide that the additional deceleration is equal to the target additional deceleration.

Then, when the absolute value of the steering speed is determined in the step S23 depicted in FIG. 4 to be decreasing, the torque reduction amount-deciding part 53 operates to maintain the additional deceleration at the maximum steering speed, as mentioned above. Specifically, in the chart (d), when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering angle is determined, in the step S21 depicted in FIG. 4, to be maintained constant or to be decreasing, the torque reduction amount-deciding part 53 operates to obtain the deceleration reduction amount in the step S27, and reduce the additional deceleration by the obtained deceleration reduction amount, as mentioned above. In the chart (d), the torque reduction amount-deciding part 53 operates to reduce the additional deceleration to cause a reduction rate of the additional deceleration to become gradually smaller, i.e., to cause a slope of the solid line indicative of a change in additional deceleration to become gradually gentler.

Chart (e) presents a change in torque reduction amount decided based on the additional deceleration presented in the chart (d). In the chart (e), the horizontal axis represents time, and the vertical axis represents torque reduction amount.

As mentioned above, the torque reduction amount-deciding part 53 operates to decide a value of the torque reduction amount required for realizing a current-cycle additional deceleration, based on parameters such as current vehicle speed, speed stage and road gradient. Thus, in the case where respective values of these parameters are constant, the torque reduction amount is decided such that it changes in the same pattern as that of the additional deceleration presented in the chart (d).

Chart (f) presents a change in basic target torque. In the chart (f), the horizontal axis represents time, and the vertical axis represents torque.

In one example shown in the chart (f), the basic target torque decided so as to realize the target acceleration set based on accelerator position, vehicle speed, speed stage and others is expressed as a linearly increasing line.

Chart (g) presents a change in during-shift torque-down demand amount. In the chart (g), the horizontal axis represents time, and the vertical axis represents during-shift torque-down demand amount.

This chart (g) presents a situation where, when the torque reduction amount is set according to the steering speed during the turning operation of the steering wheel performed between the position A and the position B, an upshift event is performed by the TCM 60 and thus the during-shift torque-down demand arises. That is, the TCM 60 operates to set the torque-down demand flag to the ON state at a time D when the torque reduction amount is maintained at the maximum value, and decide a value of the during-shift torque-down demand amount corresponding to a value of the basic target torque just before the time D, with reference to the during-shift torque-down demand amount map. Then, the TCM 60 operates to output the set torque-down demand flag and the decided during-shift torque-down demand amount to the PCM 50. This during-shift torque-down demand amount will be maintained until the TCM 60 operates to set the torque-down demand flag to the OFF state at a time E when the torque-down demand goes away due to completion of the upshift event, and output the newly-set torque-down demand flag to the PCM 50.

Chart (h) presents a change in final target torque decided, based on the basic target torque, the torque reduction amount and the during-shift torque-down demand amount.

In the chart (h), the horizontal axis represents time, and the vertical axis represents torque. In the chart (h), the dotted line indicates the basic target torque presented in the chart (f), and the solid line indicates the final target torque.

As described with reference to FIG. 3, the final target torque-deciding part 55 operates to subtract the torque reduction amount decided by the torque reduction amount-deciding processing subroutine in the step S4, or the during-shift torque-down demand amount input from the TCM 60, from the basic target torque decided in the step S3, to thereby decide the final target torque.

Specifically, in the period after start of the turning operation of the steering wheel at the position A through until the during-shift torque-down demand amount is input from the TCM 60 into the PCM 50, the during-shift torque-down demand amount is less than the torque reduction amount, so that, in the step S7 in FIG. 3, the final target torque-deciding part 55 operates to subtract the torque reduction amount from the basic target torque to thereby decide the final target torque. Thus, as indicated by the solid line in the chart (h), a change in the torque reduction amount is reflected on a change in the final target torque.

Then, in the period between the time D and the time E, the during-shift torque-down demand amount is equal to or greater than the torque reduction amount, so that, in the step S6 in FIG. 3, the final target torque-deciding part 55 operates to subtract the during-shift torque-down demand amount from the basic target torque to thereby decide the final target torque. Thus, as indicated by the solid line in the chart (h), the during-shift torque-down demand amount is reflected on the final target torque, i.e., a change in the final target torque corresponding to a change in the torque reduction amount is prohibited.

Then, when the TCM 60 operates to set the torque-down demand flag to the OFF state and output the newly-set torque-down demand flag to the PCM 50 at the time E, the during-shift torque-down demand amount becomes less than the torque reduction amount, so that, in the step S7 in FIG. 3, the final target torque-deciding part 55 operates to subtract the torque reduction amount from the basic target torque to thereby decide the final target torque. Thus, as indicated by the solid line in the chart (h), a change in the torque reduction amount is reflected on a change in the final target torque again.

Chart (i) presents a change in target air amount decided based on the final target torque. In the chart (i), the horizontal axis represents time, and the vertical axis represents air amount.

As presented in the chart (i), the target air amount changes in synchronization with a temporal change in the final target torque.

Chart (j) presents a change in yaw rare (actual yaw rate) generated when control of the engine 10 is performed so as to realize the final target torque as presented in the chart (h), and a change in actual yaw rate generated when control corresponding to the torque reduction amount presented in the chart (e) is not performed (i.e., control of the engine 10 is performed so as to realize the basic target torque indicated by the dotted line in the chart (h)), under the condition the steering wheel in the vehicle is operated as presented in the chart (b). In the chart (j), the horizontal axis represents time and the vertical axis represents yaw rate. In the chart (j), the solid line indicates a change in actual yaw rate generated when the control of the engine 10 is performed so as to realize the final target torque, and the dotted line indicates a change in actual yaw rate generated when the control corresponding to the torque reduction amount is not performed.

After clockwise steering is started at the position A, when the torque reduction amount is increased as presented in the chart (e) along with an increase in clockwise steering speed, a load applied to the front road wheels as steerable road wheels of the vehicle is increased. As a result, a frictional force between each of the front road wheels and a road surface is increased, and a cornering force of the front road wheels is increased, thereby providing an improved turn-in ability of the vehicle. That is, as presented in the chart (j), when the control of the engine 10 is performed in the intermediate zone between the position A and the position B so as to realize the final target torque reflecting the torque reduction amount (solid line), a larger clockwise (CW) yaw rate is generated in the vehicle, as compared to the case where the control corresponding to the torque reduction amount is not performed (dotted line).

In addition, as presented in the charts (d) and (e), when the steering speed gradually decreases toward the position B, the torque reduction amount is maintained at its maximum value, although the target additional deceleration synchronously decreases. Thus, it becomes possible to maintain the load applied to the front road wheels and keep up the turn-in ability of the vehicle, as long as the tuning of the steering wheel is continued.

Further, when the absolute value of the steering wheel angle is maintained constant during traveling from the position B to the position C, the torque reduction amount is smoothly reduced. Thus, in response to completion of the turning of the steering wheel, the load applied to the front road wheels can be gradually reduced to gradually reduce the cornering force of the front road wheels, thereby restoring the output torque of the engine 10, while stabilizing a vehicle body.

Next, some modifications of the above embodiment will be described.

Although the above embodiment has been described based on an example in which the torque reduction amount-deciding part 53 is configured to obtain the target additional deceleration based on the steering speed, and decide the torque reduction amount based on the obtained target additional deceleration, the torque reduction amount-deciding part 53 may be configured to decide the torque reduction amount based on any driving state of the vehicle other than the accelerator pedal operation state (e.g., steering wheel angle, yaw rate, or slip ratio).

For example, the torque reduction amount-deciding part 53 may be configured to calculate a target yaw acceleration to be generated in the vehicle, based on a target yaw rate calculated from a steering wheel angle and a vehicle speed, and a yaw rate input from a yaw rate sensor, and obtain the target additional deceleration based on the calculated target yaw acceleration to decide the torque reduction amount. Alternatively, a lateral acceleration generated along with turning of the vehicle may be detected by an acceleration sensor, and the torque reduction amount may be decided based on the detected lateral acceleration. Alternatively, the torque reduction amount-deciding part 53 may be configured to determine the torque reduction amount, based on any demand different from the target additional deceleration (e.g., a torque required for cancelling out vibration of a powertrain during acceleration/deceleration).

Although the above embodiment has been described based on an example in which the final target torque-deciding part 55 is configured to, when the during-shift torque-down demand amount is equal to or greater than the torque reduction amount, prohibit a change in the final target torque corresponding to a change in the torque reduction amount, specifically, subtract the during-shift torque-down demand amount from the basic target torque to thereby decide the final target torque, the final target torque-deciding part 55 may be configured to restrict a change in the final target torque corresponding to a change in the torque reduction amount, instead of prohibiting it.

Specifically, the final target torque-deciding part 55 may be configured to, when the during-shift torque-down demand amount is equal to or greater than the torque reduction amount, subtract, from the basic target torque, the during-shift torque-down demand amount and a value derived from multiplying the torque reduction amount by a coefficient K of less than 1, to thereby decide the final target torque. This makes it possible to satisfy both of the torque reduction based on the during-shift torque-down demand and the torque reduction based on the steering wheel operation state, while preventing a total torque reduction amount from becoming excessive.

Although the above embodiment has been described based on an example in which the final target torque-deciding part 55 is configured to, when there is the during-shift torque-down demand, restrict a change in the final target torque corresponding to a change in the torque reduction amount decided by the torque reduction amount-deciding part 53, the final target torque-deciding part 55 may be configured to, when there is any torque-down demand other than the during-shift torque-down demand, restrict a change in the final target torque corresponding to a change in the torque reduction amount.

For example, the final target torque-deciding part 55 may be configured to, when there is a torque-up and torque-down demand from a vehicle behavior control to correct a vehicle behavior during detection of skid or during detection of road wheel slip, restrict a change in the final target torque corresponding to a change in the torque reduction amount. This makes it possible to accurately realize torque-down based on the vehicle behavior control and thus provide improved safety. Alternatively, the final target torque-deciding part 55 may be configured to, when there is a torque-down demand from a brake control to avoid collision with a forward obstacle detected by a sensor, a radar, a camera or the like, restrict a change in the final target torque corresponding to a change in the torque reduction amount. This makes it possible to accurately realize torque-down based on the brake control and thus more safely avoid the forward obstacle.

Next, advantageous effects of the engine control device according to the above embodiment and the modifications thereof will be described.

In the engine control device according to the above embodiment, the final target torque-deciding part 55 is operable, when there is the during-shift torque-down demand, to restrict a change in the final target torque corresponding to a change in the torque reduction amount decided by the torque reduction amount-deciding part 53, so that, in a situation where the torque reduction according to the steering wheel operation state and the torque reduction based on the during-shift torque-down demand are overlappingly performed, it is possible to prevent a total torque reduction amount from becoming excessive. This makes it possible to control the engine so as to accurately realize a vehicle behavior as intended by a driver, while satisfying both of the torque reduction based on the during-shift torque-down demand and the torque reduction based on the steering wheel operation state to thereby suppress the occurrence of torque shock and degradation in drive feel.

In particular, the final target torque-deciding part 55 is operable, when there is the during-shift torque-down demand, to prohibit a change in the final target torque corresponding to a change in the torque reduction amount, so that, in the situation where the torque reduction according to the steering wheel operation state and the torque reduction based on the during-shift torque-down demand are overlappingly performed, it is possible to reliably prevent a total torque reduction amount from becoming excessive. This makes it possible to control the engine so as to accurately realize a vehicle behavior as intended by a driver, while satisfying both of the torque reduction based on a driving state other than the steering wheel operation state and the torque reduction based on the steering wheel operation state to thereby reliably suppress the occurrence of torque shock and degradation in drive feel.

In addition, the final target torque-deciding part 55 is operable, when the decided torque-down demand amount is less than the decided torque reduction amount, to decide the final target torque, based on the decided basic target torque and the decided torque reduction amount, and, when the decided torque-down demand amount is equal to or greater than the decided torque reduction amount, to decide the final target torque, based on the decided basic target torque and the decided torque-down demand amount, so that it becomes possible to satisfy both of the torque reduction based on a driving state other than the steering wheel operation state and the torque reduction based on the steering wheel operation state, while preventing a total torque reduction amount from becoming excessive.

What is claimed is:

1. An engine control device for controlling an engine based on a driving state of a vehicle equipped with the engine, comprising:
   a basic target torque-deciding part for deciding a basic target torque based on a driving state of the vehicle including an accelerator pedal operation state;
   a torque reduction amount-deciding part for deciding a torque reduction amount based on a steering wheel operation state of the vehicle;
   a torque-down demand amount-deciding part for deciding whether or not there is a torque-down demand, based on a driving state of the vehicle other than the steering wheel operation state, and, when there is the torque-down demand, deciding a torque-down demand amount;
   a final target torque-deciding part for deciding a final target torque, based on the decided basic target torque, the decided torque reduction amount and the decided torque-down demand amount; and
   an engine output control part for controlling the engine to cause the engine to output the decided final target torque,
   wherein the final target torque-deciding part is operable, when there is the torque-down demand, to restrict a change in the final target torque corresponding to a change in the torque reduction amount.

2. The engine control device as recited in claim 1, wherein the final target torque-deciding part is operable, when there is the torque-down demand, to prohibit a change in the final target torque corresponding to a change in the torque reduction amount.

3. The engine control device as recited in claim 1, wherein the engine control device is an engine control device for controlling an engine of a vehicle equipped with an automatic transmission, and wherein the torque-down demand amount-deciding part is operable, when a shift event of the automatic transmission is performed, to decide the torque-down demand amount so as to reduce shock due to the shift event.

4. The engine control device as recited in claim 1, wherein the final target torque-deciding part is operable, when the decided torque-down demand amount is less than the decided torque reduction amount, to decide the final target torque, based on the decided basic target torque and the decided torque reduction amount, and, when the decided torque-down demand amount is equal to or greater than the decided torque reduction amount, to decide the final target torque, based on the decided basic target torque and the decided torque-down demand amount.

5. The engine control device as recited in claim 3, wherein the torque-down demand amount-deciding part is operable, when an upshift event of the automatic transmission is performed, to refer to a torque-down demand amount map defining a relationship between an engine torque just before a shift event and the torque-down demand amount, and decide the torque-down demand amount corresponding to a current engine torque.

6. The engine control device as recited in claim 5, wherein the torque-down demand amount map is defined such that the torque-down demand amount becomes larger as a difference between engine speeds of the engine before and after a shift event becomes larger.

7. The engine control device as recited in claim 1, wherein the torque reduction amount-deciding part is operable to decide a target additional deceleration to be added to the vehicle according to a steering speed calculated from a steering wheel angle of the steering wheel, and decide a value of the torque reduction amount for realizing the target additional deceleration, the torque reduction amount-deciding part being operable to decide the target additional deceleration such that as the steering speed becomes larger, the target additional deceleration becomes larger, and a rate of increase of the target additional deceleration becomes smaller.

8. An engine control device for controlling an engine comprising a throttle valve and an ignition system based on a driving state of a vehicle equipped with the engine, comprising:
an accelerator position sensor for detecting a position of an accelerator pedal of the vehicle;
a steering wheel angle sensor for detecting a turning angle of a steering wheel of the vehicle;
a basic target torque-deciding part for deciding a basic target torque based on an output value of the accelerator position sensor;
a torque reduction amount-deciding part for deciding a torque reduction amount based on an output value of the steering wheel angle sensor;
a torque-down demand amount-deciding part for deciding whether or not there is a torque-down demand, based on a driving state of the vehicle other than the steering wheel operation state, and, when there is the torque-down demand, deciding a torque-down demand amount;
a final target torque-deciding part for deciding a final target torque, based on the decided basic target torque, the decided torque reduction amount and the decided torque-down demand amount; and
an engine output control part for controlling the throttle valve and an ignition timing of the ignition system to cause the engine to output the decided final target torque,
wherein the final target torque-deciding part is operable, when there is the torque-down demand, to restrict a change in the final target torque corresponding to a change in the torque reduction amount.

9. An engine control device for controlling an engine based on a driving state of a vehicle equipped with the engine, comprising:
a steering wheel angle sensor for detecting a turning angle of a steering wheel of the vehicle;
a basic target torque-deciding part for deciding a basic target torque based on a driving state of the vehicle including an accelerator pedal operation state;
a torque reduction amount-deciding part for deciding a target additional deceleration to be added to the vehicle according to a steering speed calculated from an output value of the steering wheel angle sensor, and decide a torque reduction amount required for realizing the target additional deceleration;
a torque-down demand amount-deciding part for deciding whether or not there is a torque-down demand, based on a driving state of the vehicle other than the steering wheel operation state, and, when there is the torque-down demand, deciding a torque-down demand amount;
a final target torque-deciding part for deciding a final target torque, based on the decided basic target torque, the decided torque reduction amount and the decided torque-down demand amount; and
an engine output control part for controlling the engine to cause the engine to output the decided final target torque,
wherein the final target torque-deciding part is operable, when there is the torque-down demand, to restrict a change in the final target torque corresponding to a change in the torque reduction amount, and
the torque reduction amount-deciding part is operable to decide the target additional deceleration such that as the steering speed becomes larger, the target additional deceleration becomes larger, and a rate of increase of the target additional deceleration becomes smaller.

\* \* \* \* \*